(12) United States Patent
Zhu et al.

(10) Patent No.: US 11,070,732 B2
(45) Date of Patent: Jul. 20, 2021

(54) METHOD FOR IMAGE PROCESSING, DEVICE, UNMANNED AERIAL VEHICLE, AND RECEIVER

(71) Applicant: SZ DJI TECHNOLOGY CO., LTD., Shenzhen (CN)

(72) Inventors: Lei Zhu, Shenzhen (CN); Ning Ma, Shenzhen (CN); Ming Gong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/446,929

(22) Filed: Jun. 20, 2019

(65) Prior Publication Data
US 2019/0313027 A1    Oct. 10, 2019

Related U.S. Application Data

(63) Continuation of application No. PCT/CN2016/113899, filed on Dec. 30, 2016.

(51) Int. Cl.
*H04N 5/232*     (2006.01)
*B64C 39/02*     (2006.01)
(Continued)

(52) U.S. Cl.
CPC ....... *H04N 5/23267* (2013.01); *B64C 39/024* (2013.01); *H04L 1/1607* (2013.01);
(Continued)

(58) Field of Classification Search
CPC .. H04N 5/23267; H04N 19/85; H04N 19/503; H04N 5/23277; H04N 19/172;
(Continued)

(56) References Cited

U.S. PATENT DOCUMENTS 8,316,268 B2  11/2012 Fukuoka
8,406,296 B2   3/2013 Nepomucenoleung et al.
(Continued)

FOREIGN PATENT DOCUMENTS

CN    1115045 A    1/1996
CN    101155311 A  4/2008
(Continued)

OTHER PUBLICATIONS

The World Intellectual Property Organization (WIPO) International Search Report for PCT/CN2016/113944 dated Sep. 27, 2017 5 pages.
(Continued)

*Primary Examiner* — Padma Haliyur
(74) *Attorney, Agent, or Firm* — Anova Law Group, PLLC

(57) ABSTRACT

An image processing method includes obtaining a current image frame. The image processing method also includes in response to feedback information, determining a reference image frame for coding the current image frame based on the feedback information. The feedback information is transmitted by a receiver based on a variable feedback time interval, and is configured to indicate a transmission status of an image frame transmitted by a transmitter to the receiver prior to the feedback information. The image processing method also includes coding the current image frame based on an inter-frame coding and the reference image frame to generate coded data. The image processing method further includes transmitting the coded data to the receiver.

16 Claims, 12 Drawing Sheets

(51) Int. Cl.
*H04N 19/85* (2014.01)
*H04L 1/16* (2006.01)
*H04N 19/503* (2014.01)

(52) U.S. Cl.
CPC ....... *H04N 5/23277* (2013.01); *H04N 19/503* (2014.11); *H04N 19/85* (2014.11); *B64C 2201/122* (2013.01); *B64C 2201/123* (2013.01)

(58) Field of Classification Search
CPC .... H04N 19/107; H04N 19/164; H04N 19/89; H04L 1/1607; B64C 39/024; B64C 2201/122; B64C 2201/123; B64C 2201/127; B64C 2201/14
See application file for complete search history.

(56) References Cited

U.S. PATENT DOCUMENTS

| | | | |
|---|---|---|---|
| 8,462,854 | B2 | 6/2013 | Henocq et al. |
| 8,687,654 | B1 | 4/2014 | Lundin |
| 8,737,475 | B2 | 5/2014 | Yan et al. |
| 8,971,415 | B2 * | 3/2015 | Hi .................... H04N 21/4425 375/240.25 |
| 9,071,484 | B1 | 6/2015 | Truax |
| 9,106,936 | B2 | 8/2015 | Wegener |
| 9,247,264 | B2 | 1/2016 | Franche et al. |
| 9,332,398 | B2 | 5/2016 | Khorashadi et al. |
| 9,338,473 | B2 * | 5/2016 | Zhao .................... H04N 19/166 |
| 9,479,800 | B2 | 10/2016 | Nepomucenoleung et al. |
| 9,584,832 | B2 | 2/2017 | Corey |
| 10,147,329 | B2 | 12/2018 | Liu et al. |
| 10,313,685 | B2 | 6/2019 | Lee et al. |
| 10,595,025 | B2 | 3/2020 | Lee et al. |
| 2005/0223333 | A1 | 10/2005 | Yamamoto et al. |
| 2008/0123775 | A1 | 5/2008 | Abreu et al. |
| 2009/0213940 | A1 | 8/2009 | Steinbach et al. |
| 2011/0085602 | A1 | 4/2011 | He |
| 2011/0122063 | A1 | 5/2011 | Perlman et al. |
| 2011/0126255 | A1 | 5/2011 | Perlman et al. |
| 2011/0249729 | A1 | 10/2011 | Zhou et al. |
| 2011/0268186 | A1 | 11/2011 | Mukherjee et al. |
| 2013/0028088 | A1 * | 1/2013 | Do ....................... H04L 1/1607 370/235 |
| 2014/0086446 | A1 | 3/2014 | Han et al. |
| 2015/0156487 | A1 | 6/2015 | Tao et al. |
| 2016/0035224 | A1 * | 2/2016 | Yang .................... G08G 5/0078 701/23 |
| 2019/0334619 | A1 | 10/2019 | Aoyama et al. |

FOREIGN PATENT DOCUMENTS

| | | |
|---|---|---|
| CN | 101166270 A | 4/2008 |
| CN | 101193312 A | 6/2008 |
| CN | 101207823 A | 6/2008 |
| CN | 101360243 A | 2/2009 |
| CN | 101983509 A | 3/2011 |
| CN | 102014286 A | 4/2011 |
| CN | 102075741 A | 5/2011 |
| CN | 102299784 A | 12/2011 |
| CN | 102510494 A | 6/2012 |
| CN | 102547266 A | 7/2012 |
| CN | 102684837 A | 9/2012 |
| CN | 102780547 A | 11/2012 |
| CN | 102946534 A | 2/2013 |
| CN | 101690202 B | 3/2013 |
| CN | 103168469 A | 6/2013 |
| CN | 104270181 A | 1/2015 |
| CN | 104660315 A | 5/2015 |
| CN | 104756398 A | 7/2015 |
| CN | 102484748 B | 9/2015 |
| CN | 105163126 A | 12/2015 |
| CN | 105681342 A | 6/2016 |
| CN | 107005714 A | 8/2017 |
| CN | 107113441 A | 8/2017 |

OTHER PUBLICATIONS

World Intellectual Property Organization (WIPO) International Search Report for PCT/CN2016/113899 dated Oct. 10, 2017 5 Pages.
World Intellectual Property Organization (WIPO) International Search Report and Written Opinion for PCT/CN2017/120225 dated Mar. 27, 2018 8 pages.
Qiang Peng, Rate-Distortion Analysis for Feedback-Based Adaptive Reference Picture Selection, Journal of Electronics & Information Technology, Jun. 2009, p. 1455-1459, vol. 31 No. 6, School of Information Science & Technology, Southwest Jiaotong University, Chengdu, China.
Shigeru Fukunaga, et al., Error Resilient Video Coding Controlled by Backward Channel Signaling, Signaling Processing Image Communication, 1999, pp. 531-540.

* cited by examiner

METHOD FOR IMAGE PROCESSING, DEVICE, UNMANNED AERIAL VEHICLE, AND RECEIVER

CROSS-REFERENCE TO RELATED APPLICATION

This application is a continuation application of International Application No. PCT/CN2016/113899, filed on Dec. 30, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of image processing and, more particularly, to a method for image processing, a device, an unmanned aircraft, and a receiver.

BACKGROUND

Low latency video transmission over wireless and unreliable channels has become a popular research topic and application development direction. For unreliable video transmission, data loss and data transmission error may occur in the data transmission process, which may result in video decoding errors. However, the transmitter cannot predict when the data loss and data transmission error may occur. Therefore, there is a need for an error-recovery mechanism to correct the already occurred video data errors.

However, the currently available methods for correcting data transmission errors often waste channel resource bandwidth, and can cause transmission latency jittering, thereby affecting the user experience.

SUMMARY

In accordance with an aspect of the present disclosure, there is provided an image processing method including obtaining a current image frame. The image processing method also includes in response to feedback information, determining a reference image frame for coding the current image frame based on the feedback information. The feedback information is transmitted by a receiver based on a variable feedback time interval, and is configured to indicate a transmission status of an image frame transmitted by a transmitter to the receiver prior to the feedback information. The image processing method also includes coding the current image frame based on an inter-frame coding and the reference image frame to generate coded data. The image processing method further includes transmitting the coded data to the receiver In accordance with another aspect of the present disclosure, there is also provided an unmanned aerial vehicle. The unmanned aerial vehicle includes a storage device configured to store computer-executable instructions. The unmanned aerial vehicle also includes at least one processor configured to access the storage device and to execute the computer-executable instructions to perform a method. The method includes obtaining a current image frame. The method also includes in response to feedback information, determining a reference image frame for coding the current image frame based on the feedback information. The feedback information is transmitted by a receiver based on a variable feedback time interval, and is configured to indicate a transmission status of an image frame transmitted by a transmitter to the receiver prior to the feedback information. The method also includes coding the current image frame based on an inter-frame coding and the reference image frame to generate coded data. The method further includes transmitting the coded data to the receiver.

According to the present disclosure, a transmitter may determine a reference image frame for coding a present image frame based on received feedback information. As such, there is no need to transmit an intra-frame coded frame or a fault-tolerant frame group to the receiver. The present disclosure can enable the receiver to recover the data error, improve the utility rate of the channel resources, and enhance the user experience.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
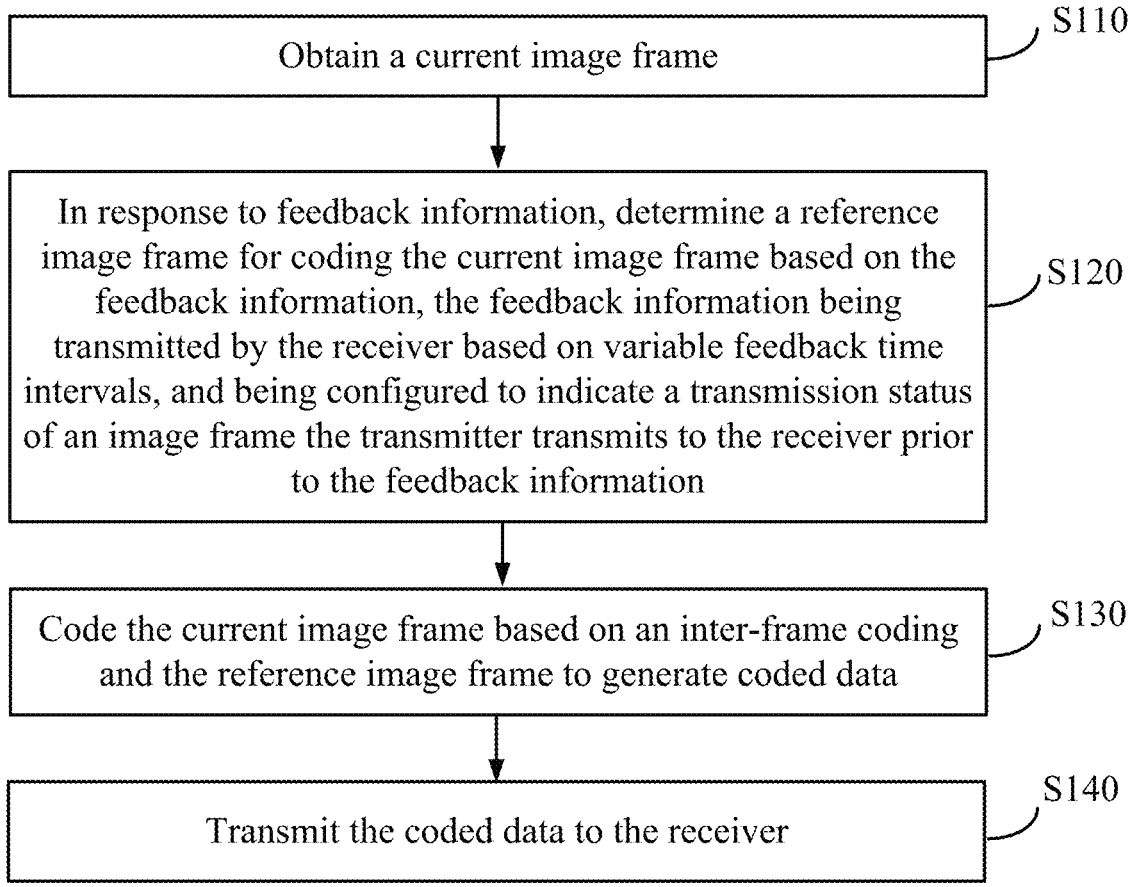
FIG. 1 is a flow chart illustrating an image processing method implemented at a transmitter, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

FIG. 1 is a flow chart illustrating a method for image processing. The method may be executed by an imaging processing device included in a transmitter. The image processing device may include any suitable image processing chips, image processing processors, etc. The transmitter may be configured to transmit coding data of an image frame to a receiver. As shown in FIG. 1, a method 100 may include:

Step S110: obtaining a current image frame;

Step S120: in response to feedback information, determining a reference image frame for coding the current image frame based on the feedback information. The feedback information may be transmitted by the receiver based on a variable feedback time interval. The feedback information may be configured to indicate a transmission status of an image frame the transmitter transmits to the receiver prior to the feedback information.

In some embodiments, the transmission status may indicate whether an error occurred in the transmission of the image frame. For example, the transmission status may indicate whether there is a data loss or a data error during the process of transmitting the image frame, or in other words, whether the image frame is transmitted correctly, and whether the image frame is successfully decoded after the transmission.

Step S130: coding the current image frame based on an inter-frame coding and the reference image frame to generate coded data.

In some embodiments, when coding the current image frame, the coding method adopted may be an inter-frame coding method or referred as an inter-frame predictive coding method, to obtain a predicted coded image frame. The predicted coded image frame may be obtained by a coding method that not only compresses spatial redundant information within the current image frame, but also compresses data based on time redundancy between the current image frame and the reference image frame. In other words, the coding method predicts in a time domain and performs coding. A compression efficiency of such an inter-frame coded frame may be much higher than an intra-frame coded frame. As such, the coded frames transmitted by the transmitter to the receiver are inter-frame coded frames, which may improve the utilization rate of channel resources, and reduce the transmission latency.

In some embodiments, when inter-frame coding the current image frame, the bit rate may be controlled within a predetermined range (e.g., lower than a maximum bit rate, higher than a minimum bit rate) or close to a target average bit rate. In some embodiments, the bit rate may be controlled to vary based on the complexity of the current image frame, a limit on the bandwidth, a capacity of a buffer, or other factors.

Step S140: transmitting the coded data to the receiver.

According to the image processing method of the present disclosure, an image processing device in the transmitter may determine a reference image frame of the current image frame based on received feedback information. The transmitter may determine image frames that have been correctly transmitted based on the feedback information, and may select an image frame to be the reference image frame from the image frames that have been correctly transmitted. As such, once the receiver successfully receives the coded data of the current image frame, the receiver may recover transmission errors. Accordingly, in some embodiments, the image processing device of the transmitter does not need to transmit an intra-frame coded frame or a fault-tolerant frame group. The image processing device of the receiver may still recover (e.g., correct) the transmission errors, which may improve the utilization rate of the channel resources, and improve user experience.

In some embodiments, the transmitter of the present disclosure may be movable in any suitable environment, such as in the air (e.g., a fixed-wing aircraft, a rotorcraft, or an aircraft without a fixed-wing or a rotor), in the water (e.g., a ship or a submarine), on the ground (e.g., a car or a train), in the space (e.g., a spacecraft, a satellite, or a probe), or a combination of the above different types of environment. The transmitter may be part of an unmanned aircraft, such as an unmanned aerial vehicle ("UAV") (e.g., the transmitter may be the UAV). In some embodiments, the transmitter may carry a living object, such as a human being or an animal.

In some embodiments, the receiver may include a computer, a handheld electronic device, a communication device, or a video surveillance device, etc.

In step S120, the image processing device in the transmitter may determine image frames that have been correctly transmitted based on the feedback information, and determine the reference image frame from the image frames that have been correctly transmitted.

A conventional technical solution may include periodically transmitting a fault-tolerant frame (e.g., an intra-frame coded frame) or a fault-tolerant frame group to correct data transmission errors. The present technical solution differs from the conventional technical solution in that in the present technical solution, the image processing device of the transmitter may determine the reference image frame based on the image frames that have been correctly transmitted, and code the current image frame based on inter-frame coding. In the present technical solution, when the receiver successfully receives the coded data of the current image frame, the receiver may recover the transmission errors. As such, the image processing device of the transmitter does not need to transmit a fault-tolerant frame or a fault-tolerant frame group to the image processing device of the receiver, and yet, the image processing device of the receiver may still recover the transmission errors. The present technical solution increases the utilization rate of channel resources, and improves user experience.

In some embodiments, exemplary and non-limiting feedback information may include at least one of: indicator information that indicates whether a last image frame transmitted prior to the feedback information has been correctly transmitted; a frame number of an image frame that has been correctly transmitted; or a frame number of a last image frame that has been correctly transmitted prior to the feedback information.

In some embodiments, a frame number of an image frame may be globally unique. The frame number of the image frame and the coded data may be transmitted to the receiver together.

Figure 2:
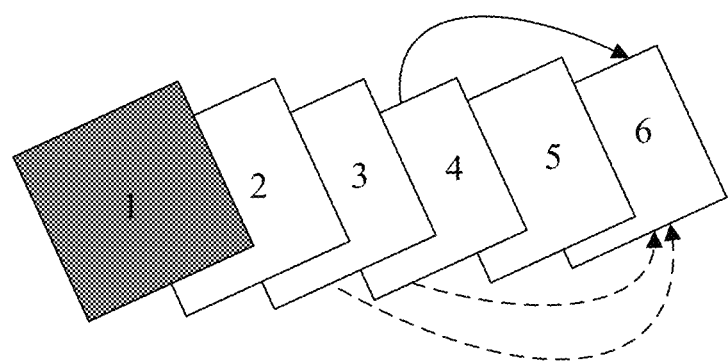
FIG. 2 is schematic illustration of selecting a reference image frame, according to an example embodiment.

In some embodiments, as shown in FIG. 2, assuming that prior to the current image frame (frame number 6), the transmitter has already transmitted 5 image frames to the receiver, corresponding to frame numbers 1-5, among which image frames numbered 2, 3, and 4 have been correctly transmitted. The feedback information may include the frame number of the image frame that has been correctly transmitted. For example, the feedback information may include "234." In some embodiments, the feedback information may include the frame number of the last image frame that has been correctly transmitted. For example, the feedback information may include "4." The image processing device of the transmitter may understand, based on the feedback information, that the number 5 image frame has not been successfully transmitted. When the image processing device of the transmitter codes the number 6 image frame, the image processing device may select the number 4 image frame as the reference image frame, or may select the number 3 and number 4 image frames as the reference image frames.

Assuming that prior to the current image frame (assuming the frame number is 9), the transmitter has transmitted 8 image frames to the receiver, corresponding to numbers 1-8, and the receiver has provided feedback to the transmitter based on image frames 1-5, then, the current feedback information need only include the transmission status of the number 8 image frame. The feedback information may include an indicator for indicating whether the number 8 image frame has been correctly transmitted. Assuming value "0" of the indicator indicates that the number 8 image frame has not been correctly transmitted, and value "1" of the indicator indicates that the number 8 image frame has been correctly transmitted, if the value of the indicator is 1, the image processing device of the transmitter may select number 8 image frame as a reference image frame when performing an inter-frame coding of the number 9 image frame. If the value of the indicator is 0, the image processing device of the transmitter may determine whether the number 5 image frame has been correctly transmitted. If the number 5 image frame has been correctly transmitted, the image processing device of the transmitter may select the number 5 image frame as the reference image frame when performing an inter-frame coding of the number 9 image frame.

In some embodiments, the image processing device of the transmitter may be configured to store at least a portion of the image frames that have been correctly transmitted to a reference image frame managing array. The image processing device of the transmitter may select an image frame from the reference image frame managing array as a reference image frame. When the transmitter receives the feedback information from the receiver, the transmitter may determine one or more image frames that have been correctly transmitted based on the feedback information, and update the reference image frame managing array. Correspondingly, in some embodiments, after the image processing device of the receiver determines the correctly transmitted one or more image frames, the image processing device may store at least a portion of the one or more correctly transmitted image frames to a reference image frame managing array. The reference image frame managing array of the transmitter and the reference image frame managing array of the receiver may store the same information.

In some embodiments, the image processing device of the transmitter may include a physical or logical buffer configured to store image frames corresponding to the coded data. The image processing device of the transmitter may store at least a portion of the frame numbers corresponding to the correctly transmitted image frames to the reference image frame managing array. The image processing device of the transmitter may determine one or more of the image frames corresponding to the one or more frame numbers stored in the image frame managing array as a reference frame (or reference frames). Correspondingly, the image processing device of the receiver may include a physical or logical buffer configured to store the image frames corresponding to the decoded data. The image processing device of the receiver may store at least a portion of the frame numbers corresponding to the correctly transmitted image frames to the reference image frame managing array.

In some embodiments, the image processing device of the receiver may transmit feedback information to the transmitter at a variable feedback time interval. For example, the image processing device of the receiver may transmit the feedback information to the image processing device of the transmitter at a first feedback time interval in a first time period. The image processing device of the receiver may transmit the feedback information to the image processing device of the transmitter at a feedback time interval in a second time period, which is after the first time period. The first feedback time interval may be different from or the same as the second feedback time interval. For example, the first time period and the second time period may be pre-set by the system or by the user. The disclosed technical solution may obtain a suitable coding efficiency and a utilization rate of the channel. The variable feedback time interval may be transmitted to the image processing device of the receiver by the image processing device of the transmitter after the image processing device of the transmitter determines the variable feedback time interval. In some embodiments, the variable feedback time interval may be determined by the image processing device of the receiver.

In some embodiments, the feedback time interval may be determined based on actual situations using various methods. For example, the feedback time interval may be determined based on at least one of: a load status of a feedback channel; a demand on a timeliness of error recovery by an application scene at the transmitter; a transmission error rate in a predetermined time period; or historical data transmission status. In some embodiments, when the transmitter is included in a UAV, the feedback time interval may be determined based on attitude information of the transmitter.

In some embodiments, the feedback time interval may be determined based on the load of the feedback channel. For example, when the load of the feedback channel reaches (e.g., becomes greater than or equal to) a predetermined value, the feedback time interval may be increased; when the load of the feedback channel becomes smaller than the predetermined value, the feedback time interval may be decreased.

In some embodiments, the feedback time interval may be determined based on the demand on the timeliness of error recovery by the application scene. For example, when the demand on the timeliness of error recovery by the application scene is coded data of at least 3 out of every 5 image frames are correct, then in practical transmission, when the transmission correctness rate reaches 3/5, the feedback time interval may be increased; when the transmission correctness rate is less than 3/5, the feedback time interval may be decreased.

In some embodiments, the feedback time interval may be determined based on historical data transmission status. For example, in a predetermined time period, when a count of continuous occurrences of feedback information indicating transmission error is smaller than a first predetermined value, or when a total count of occurrences of feedback information indicating transmission error in the predetermined time period is smaller than a second predetermined value, the feedback time interval may be increased. In the predetermined time period, when the count of continuous occurrences of feedback information indicating transmission error is not smaller than the first predetermined value, or when the total count of the occurrences of feedback information indicating transmission error in the predetermined time period is not smaller than the second predetermined value, the feedback time interval may be decreased.

In some embodiments, when the transmitter is included in the UAV (e.g., the transmitter may be the UAV), the image processing device of the transmitter may determine the feedback time interval based on the attitude information of the transmitter. The attitude information may include, but not be limited to, three-dimensional location, three-dimensional angle, three-dimensional velocity, three-dimensional acceleration, and three-dimensional angular velocity. For example, when a three-dimensional velocity of a first device is relatively large, it may indicate that a difference in changes of captured images at the transmitter is relatively large. Accordingly, the feedback time interval may be decreased. When the three-dimensional velocity of the transmitter is relatively small (e.g., 0), it may indicate that the difference in changes of captured images at the transmitter is relatively small (e.g., no difference). Accordingly, the feedback time interval may be increased.

In some embodiments, the transmitter may determine the attitude information of the transmitter based on attitude information measured by a sensing system of the transmitter. The attitude information of the transmitter may include at least one of: a three-dimensional location, a three-dimensional angle, a three-dimensional velocity, a three-dimensional acceleration, and a three-dimensional angular velocity. The sensing system of the transmitter may include at least one of the following equipment: a gyroscope, a digital compass, an inertial measurement unit ("IMU"), a vision sensor, a global positioning system ("GPS"), and a barometer.

In some embodiments, feedback information may be transmitted from the receiver to the transmitter based on the variable feedback time interval. As a result, the burden on the channel can be reduced.

In some embodiments, the feedback time interval may be determined by the image processing device of the transmitter based on one or more of a load of the feedback channel, a demand on the timeliness of error recovery by the application scene, and historical data transmission status.

Detailed method can refer to the above descriptions, which are not repeated.

In some embodiments, the feedback time interval may be determined based on a negotiation between the transmitter and the receiver.

In some embodiments, the receiver may determine a first feedback time interval based on at least one of: the load of the feedback channel, the demand on the timeliness of error recovery by the application scene, or the historical data transmission status. The receiver receives a second feedback time interval transmitted by the transmitter. The receiver may determine a third feedback time interval based on the first feedback time interval and the second feedback time interval. For example, it is assumed that the feedback time interval determined by the receiver based on the load situation of the feedback channel is a first interval, and the feedback time interval determined by the receiver based on the attitude information of the transmitter is a second interval. It is also assumed that when the first interval is greater than the second interval, the receiver adopts the second interval as the feedback time interval. Then, when the first interval determined by the receiver is greater than the second interval determined by a first device, the second interval may be determined as the feedback time interval.

In some embodiments, the receiver may transmit feedback information to the transmitter based on the variable feedback time interval. This may increase the utilization rate of the channel.

In some embodiments, because the feedback information is transmitted by the image processing device of the receiver based on a variable feedback time interval, during a time period in which the image processing device of the transmitter does not receive the feedback information, the image processing device of the transmitter may determine a predetermined number of image frames transmitted prior to the current image frame as the reference image frames. For example, the image processing device of the transmitter may select an image frame that is the closest to the current image frame as the reference image frame. When the image processing device of the transmitter receives the feedback information, and when the frame numbers of the image frames included in the feedback information change in a jumping manner, the image processing device of the transmitter may select an image frame that has been successfully transmitted as a reference image frame for coding the current image frame.

In all of the disclosed embodiments, when the image processing device of the transmitter transmits to the image processing device of the receiver coded data of the current image frame after it is coded, the image processing device of the transmitter may package the coded data to obtain a data packet. The data packet may include at least one of a packet serial number or a check value. After the image processing device of the receiver receives the data packet, the image processing device may determine the transmission status of the current image frame based on at least one of the packet serial number or the check value.

In some embodiments, in real-time transport protocol ("RTP"), the packet serial number may be the RTP packet serial number. In transmission control protocol/Internet protocol ("TCP/IP"), the packet serial number is the IP packet serial number.

In some embodiments, as a non-limiting example, the image processing device of the transmitter may package the coded data generated after the current image frame is coded as a data packet. The packet serial number of the data packet may have a corresponding relationship with the frame number of the current image frame. The image processing device of the receiver may detect whether there is data loss based on whether the received packet serial numbers of the data packets are continuous. When the image processing device of the receiver determines that the received packet serial numbers of the data packets do not include the packet serial number of the data packet corresponding to the current image frame, the image processing device of the receiver may determine that there is data loss, i.e., the transmission of the current image frame failed. In some embodiments, the image processing device of the receiver may calculate a check value based on the data included in the data packet. When the calculated check value is not consistent with the check value carried in the data packet, the image processing device of the receiver may determine that there is data error, i.e., the transmission of the current image failed.

In some embodiments, the image processing device of the transmitter may package the coded data generated after the current image frame is coded into multiple data packets. The packet serial numbers of all of the data packets may correspond with the frame number of the current image frame. In some embodiments, the image processing device of the receiver may detect whether there is data loss based on a determination of whether the packet serial numbers of the data packets are continuous. For example, the image processing device of the transmitter may packet the coded data generated after the current image frame is coded into 4 data packets, with packet serial numbers 1, 2, 3, and 4. When the image processing device of the receiver determines that the packet serial numbers of the received data packets are 1, 2, and 4, the image processing device may determine that there is data loss, i.e., the transmission of the current image frame failed. In some embodiments, the image processing device of the receiver may determine whether there is data error based on the above-described method based on calculating the check value.

In some embodiments, the check value included in the data packet may be a cyclical redundancy check ("CRC") value.

The above describes embodiments of the image processing methods implemented at the transmitter with reference to FIG. 1 and FIG. 2. Next, another embodiment of the image processing method implemented at the receiver will be described with reference to FIG. 3. It should be understood that the interactions between the receiver and the transmitter, as described from the perspective of the transmitter, and the related characteristics, functions, etc., are similar to the corresponding items described above from the perspective of the receiver. Thus, for simplicity, relevant repeated descriptions are omitted.

Figure 3:
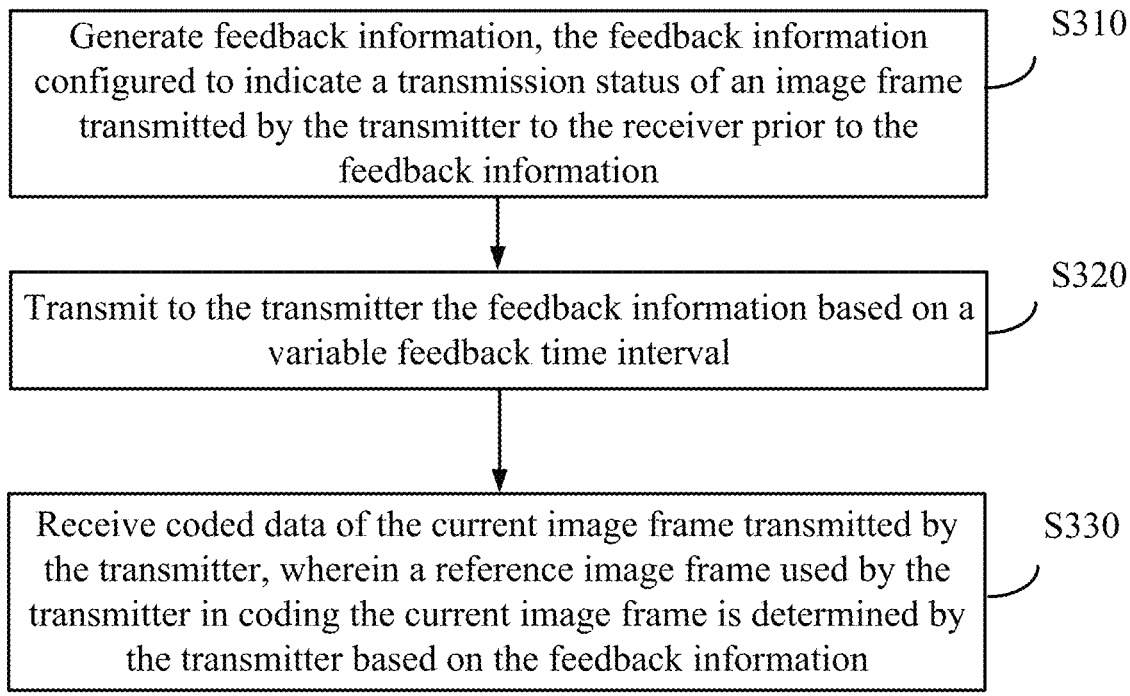
FIG. 3 is a flow chart illustrating an image processing method implemented at a receiver, according to an example embodiment.

FIG. 3 is a flow chart illustrating another embodiment of the image processing method. The method may be executed or implemented by the image processing device of the receiver. The image processing device may include any suitable types of image processing chips, image processor, etc. As shown in FIG. 3, a method 300 may include:

Step S310: generating feedback information, the feedback information configured to indicate a transmission status of an image frame transmitted by the transmitter to the receiver prior to the feedback information.

Step S320: transmitting to the transmitter the feedback information based on a variable feedback time interval.

Step S330: receiving coded data of the current image frame transmitted by the transmitter. A reference image frame used by the transmitter in coding the current image frame is determined by the transmitter based on the feedback information.

As such, according to the image processing method of the present disclosure, the image processing device of the receiver may transmit feedback information to the image processing device of the transmitter based on a variable feedback time interval, such that the image processing device of the transmitter may determine a reference image frame to be used for coding the current image frame based on the feedback information. The image processing device of the transmitter does not need to transmit an intra-frame coding frame or a fault-tolerant frame group, and yet can still enable the image processing device of the receiver to recover the transmission error, thereby increasing the utilization rate of the channel resources and improving the user experience.

Figure 4:
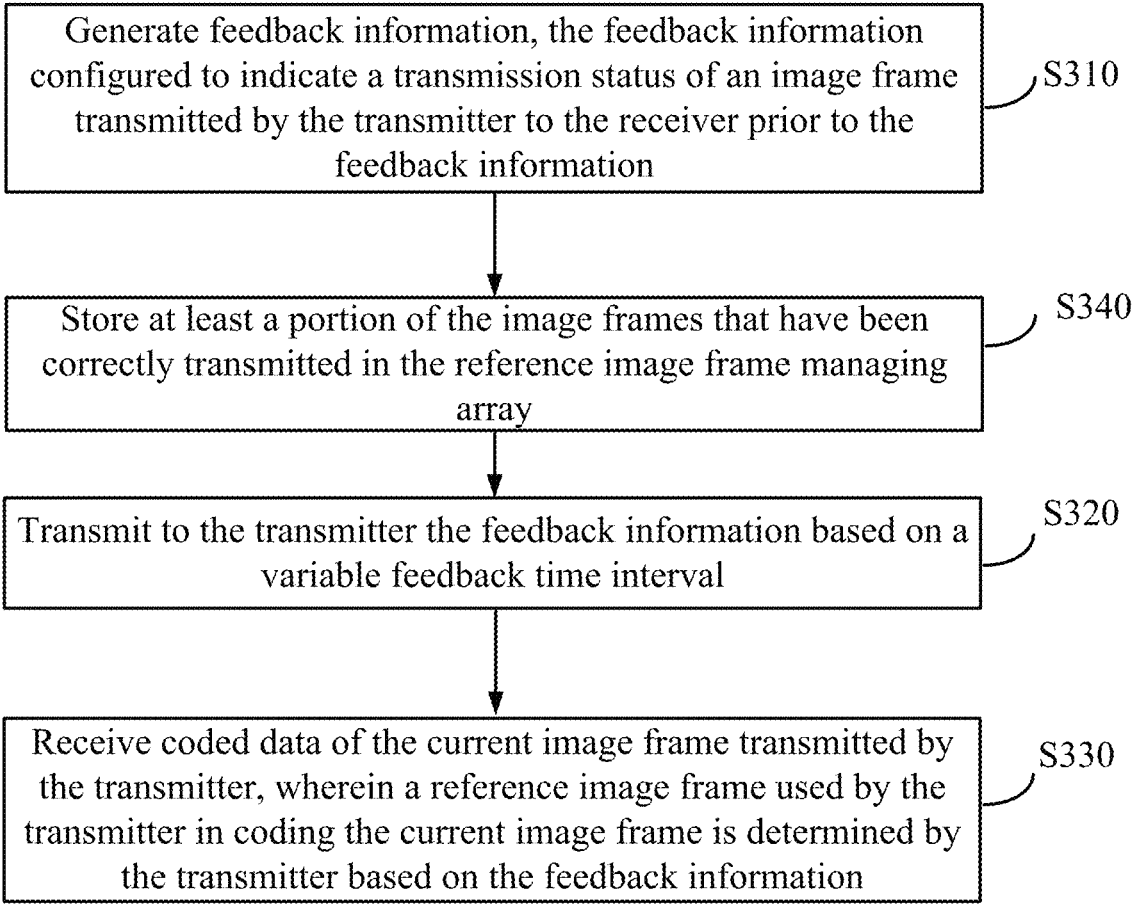
FIG. 4 is a flow chart illustrating an image processing method implemented at a receiver, according to another example embodiment.

In some embodiments, as shown in FIG. 4, before step S320, the method 300 may also include:

Step S340: storing at least a portion of the image frames that have been correctly transmitted in the reference image frame managing array.

In some embodiments, the feedback information may include at least one of the following: indicator information that indicates whether a last image frame transmitted prior to the feedback information has been correctly transmitted; a frame number of an image frame that has been correctly transmitted; or a frame number of a last image frame that has been correctly transmitted prior to the feedback information.

Figure 5:
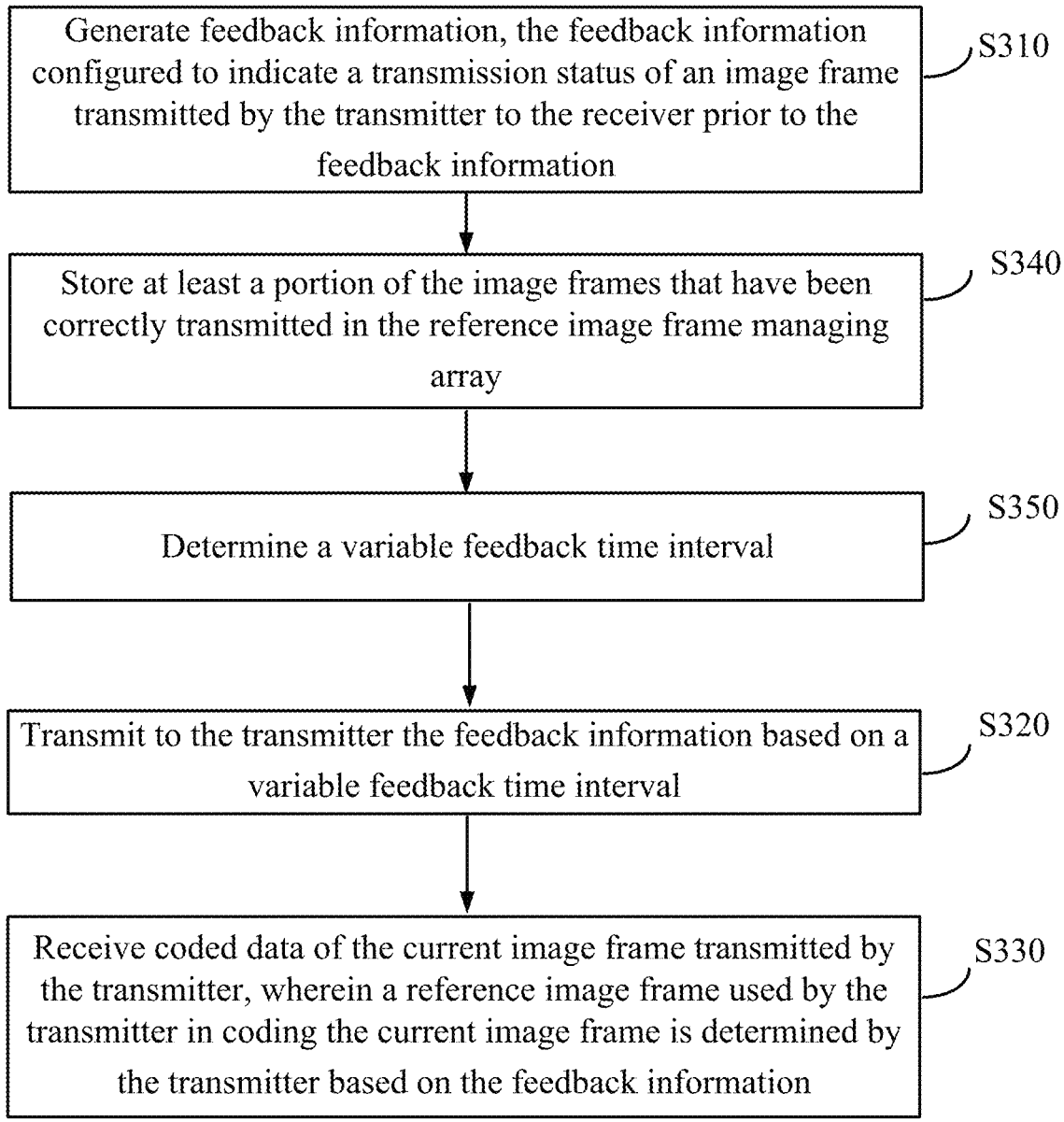
FIG. 5 is a flow chart illustrating an image processing method implemented at a receiver, according to another example embodiment.

In some embodiments, as shown in FIG. 5, the method 300 may include:

Step S350: determining a variable feedback time interval.

In some embodiments, the variable feedback time interval may be determined based on at least one of: a load status of a feedback channel; a demand on a timeliness of error recovery by an application scene at the transmitter; or a transmission error rate in a predetermined time period.

In some embodiments, the variable feedback time interval may be determined based on receiving a variable feedback time interval transmitted by the transmitter.

In some embodiments, the variable feedback time interval may be dynamically determined based on a speed of change of attitude of the transmitter transmitted by the transmitter.

In some embodiments, a data packet transmitted by the transmitter may be received. The data packet may be obtained or generated by the transmitter by packaging the coded data. The data packet may include at least one of a packet serial number or a check value.

In some embodiments, the method 300 may include: determining a transmission status of the current image frame based on at least one of the packet serial number or the check value.

In some embodiments, the transmitter may be part of a UAV or the UAV.

Figure 6:
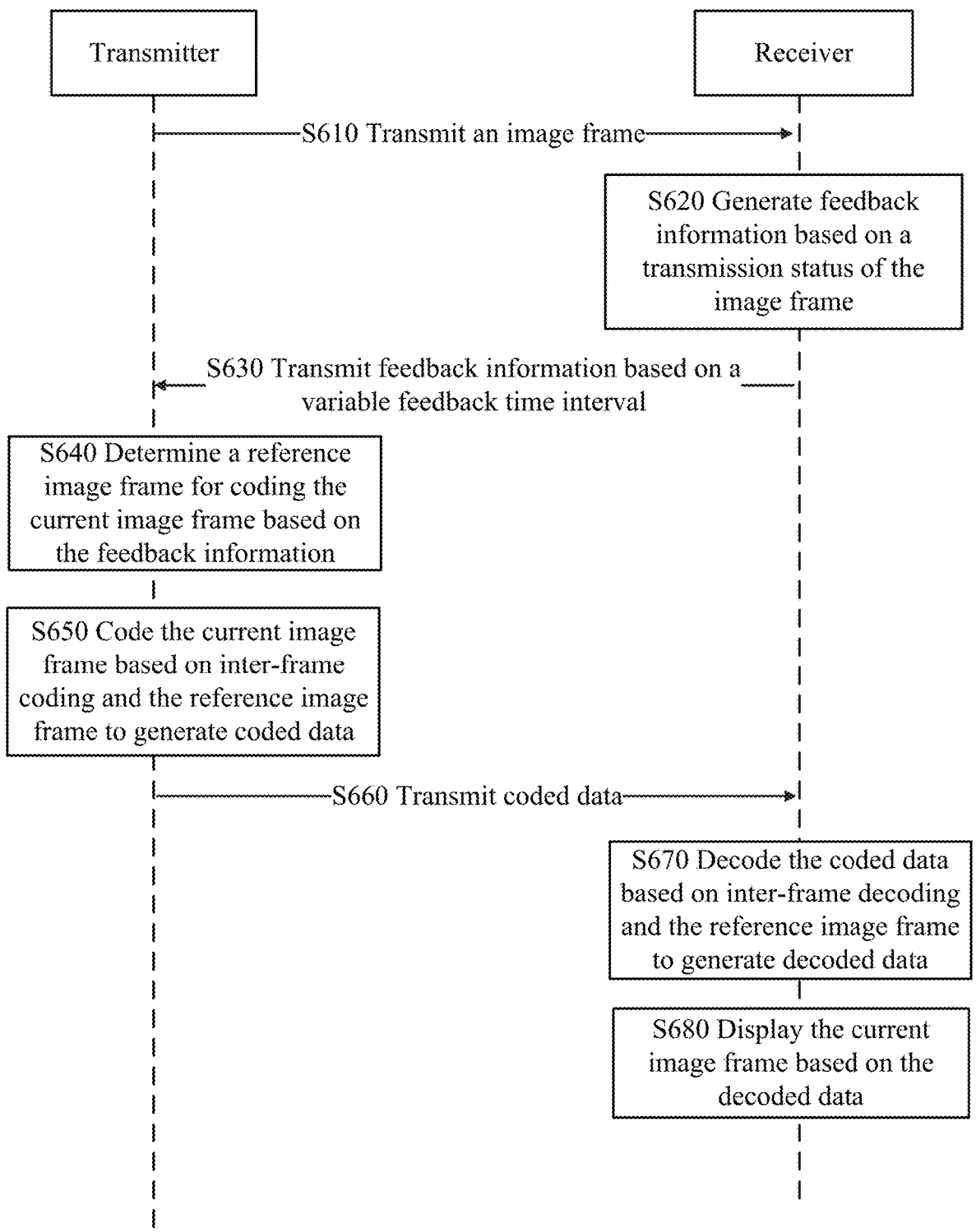
FIG. 6 is a flow chart illustrating an image processing method, according to an example embodiment.

FIG. 6 is a flow chart illustrating another embodiment of the image processing method. As shown in FIG. 6, a method 600 may include:

Step S610: the transmitter transmits an image frame to the receiver;

Step S620: the receiver generates feedback information based on a transmission status of the image frame;

Step S630: the receiver transmits the feedback information to the transmitter based on a variable feedback time interval;

Step S640: the transmitter determines a reference image frame for coding the current image frame based on the feedback information;

Step S650: the transmitter codes the current image frame based on inter-frame coding and the reference image frame to generate coded data;

Step S660: the transmitter transmits the coded data to the receiver;

Step S670: the receiver decodes the coded data based on inter-frame decoding and the reference image frame to generated decoded data;

Step S680: the receiver displays the current image frame based on the decoded data.

It should be understood that the interaction between the receiver and the transmitter in the method 600, and the related characteristics, functions, etc., correspond to those described above in connection with method 100. For simplicity, the descriptions are not repeated.

The above describes embodiments of the image processing method. Next, embodiments of an image processing device will be described. It is understood that the image processing device may implement the above-described image processing methods. To avoid repeated descriptions, the image processing device will be briefly described.

Figure 7:
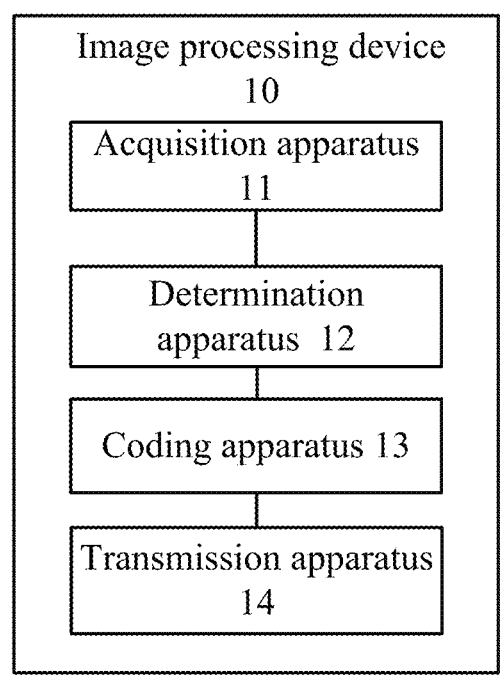
FIG. 7 is a schematic diagram of an image processing device, according to an example embodiment.

FIG. 7 is a schematic diagram of an image processing device. As shown in FIG. 7, an image processing device 10 may include:

an acquisition apparatus 11 configured to obtain or acquire a current image frame;

a determination apparatus 12 configured to determine, in response to the feedback information, a reference image frame for coding the current image frame based on the feedback information. The feedback information may be transmitted by the receiver based on a variable feedback time interval. The feedback information may be configured to indicate a transmission status of an image frame transmitted to the receiver by the transmitter prior to the feedback information;

a coding apparatus 13 configured to code the current image frame based on inter-frame coding and the reference image frame to generate coded data; and a transmission apparatus 14 configured to transmit the coded data to the receiver.

In some embodiments, an image processing device of the transmitter may determine a reference image frame for coding the current image frame based on the received feedback information. Thus, the image processing device of the transmitter does not need to transmit an intra-frame coding frame or a fault-tolerant frame group, and yet can still enable an image processing device of the receiver to recover transmission errors, thereby increasing the utilization rate of the channel resources and improving user experience.

In some embodiments, the determination apparatus 12 may be configured to:

determine one or more correctly transmitted image frames based on the feedback information; and determine a reference image frame based on the one or more correctly transmitted image frames.

In some embodiments, the determination apparatus 12 may be configured to:

store at least a portion of the one or more correctly transmitted image frames to a reference image frame managing array; and determining a reference image frame based on one or more image frames stored in the reference image frame managing array.

In some embodiments, the determination apparatus 12 may be configured to:

in response to not receiving the feedback information (or based on a determination that the feedback information is not received), determine a predetermined number of image frames transmitted prior to the current image frame as the reference image frames.

In some embodiments, the feedback information may include at least one of:

indicator information that indicates whether a last image frame transmitted prior to the feedback information has been correctly transmitted;

a frame number of an image frame that has been correctly transmitted; or a frame number of a last image frame that has been correctly transmitted prior to the feedback information.

In some embodiments, the determination apparatus 12 may be configured to:

determine the variable feedback time interval.

In some embodiments, the transmission apparatus 14 may be configured to: transmit the variable feedback time interval to the receiver.

In some embodiments, the determination apparatus 12 may be configured to:

determine the variable feedback time interval based on at least one of:

a load status of a feedback channel;

a demand on a timeliness of error recovery by an application scene at the transmitter; or a transmission error rate in a predetermined time period.

In some embodiments, the determination apparatus 12 may be configured to:

determine a speed of change of attitude of the transmitter; and adjust the variable feedback time interval based on the speed of change of the attitude.

In some embodiments, the transmission apparatus 14 may be configured to:

packaging the coded data to obtain a data packet. The data packet may include at least one of: a packet serial number or a check value; and transmit the data packet to the receiver.

In some embodiments, the transmitter may be part of the UAV or may be the UAV.

In some embodiments, the image processing device 10 may be configured to execute or implement method 100 and various other embodiments of the disclosed image processing methods. For simplicity, such descriptions are not repeated.

Figure 8:
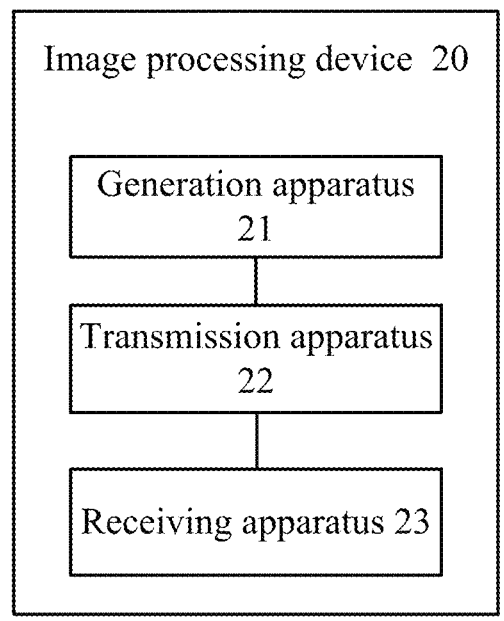
FIG. 8 is a schematic diagram of an image processing device, according to another example embodiment.

FIG. 8 is a schematic diagram of an image processing device included in a receiver. As shown in FIG. 8, an image processing device 20 may include:

a generation apparatus 21 configured to generate feedback information; the feedback information configured to indicate a transmission status of an image frame transmitted by the transmitter to the receiver prior to the feedback information;

a transmission apparatus 22 configured to transmit the feedback information to the transmitter based on a variable feedback time interval;

a receiving apparatus 23 configured to receive coded data of the current image frame transmitted by the transmitter. The reference image frame used by the transmitter for coding the current image frame may be determined by the transmitter based on the feedback information.

In some embodiments, an image processing device of the receiver may transmit feedback information to an image processing device of the transmitter based on a variable feedback time interval, such that the image processing device of the transmitter may determine a reference image frame for coding the current image frame based on the received feedback information. As such, the image processing device of the transmitter does not need to transmit an intra-frame coding frame or a fault-tolerant frame group, and yet can still enable the image processing device of the receiver to recover transmission errors, thereby increasing the utilization rate of the channel resources and improving the user experience.

In some embodiments, the transmission apparatus 22 may be configured to:

store at least a portion of one or more correctly transmitted image frames to a reference image managing array.

In some embodiments, the feedback information may include at least one of the following:

indicator information that indicates whether a last image frame transmitted prior to the feedback information has been correctly transmitted;

a frame number of an image frame that has been correctly transmitted; or a frame number of a last image frame that has been correctly transmitted prior to the feedback information.

In some embodiments, the transmission apparatus 22 may be configured to:

determine the variable feedback time interval.

In some embodiments, the transmission apparatus 22 may be configured to:

determine the variable feedback time interval based on at least one of:

a load status of a feedback channel;

a demand on a timeliness of error recovery by an application scene at the transmitter; or a transmission error rate in a predetermined time period.

In some embodiments, the receiving apparatus 23 may be configured to:

receive the variable feedback time interval transmitted by the transmitter.

In some embodiments, the variable feedback time interval may be dynamically determined by the transmitter based on a speed of change of attitude of the transmitter.

In some embodiments, the receiving apparatus 23 may be configured to:

receive a data packet transmitted by the transmitter; the data packet may be obtained by the transmitter by packaging the coded data; the data packet may include at least one of a packet serial number or a check value; and determine a transmission status of the current image frame based on at least one of the packet serial number or the check value.

In some embodiments, the transmitter may be part of the UAV or may be the UAV.

It is understood that the image processing device 20 may execute or implement the method 300 and other embodiments of the disclosed image processing methods. For simplicity, detailed descriptions of how the image processing device 20 are omitted.

Figure 9:
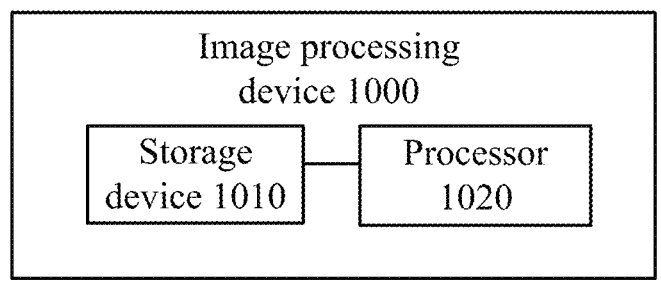
FIG. 9 is a schematic diagram of an image processing device, according to another example embodiment.

FIG. 9 is a schematic diagram of an embodiment of an image processing device. As shown in FIG. 9, an image processing device 1000 may include at least one storage device 1010 configured to store computer-executable codes or instruction; at least one processor 1020. The at least one processor 1020 may be independently or collectively configured to: access the at least one storage device 1010 and execute the computer-executable codes to implement method 100 and other various embodiments of the disclosed image processing methods. For simplicity, detailed descriptions of the execution are omitted.

Figure 10:
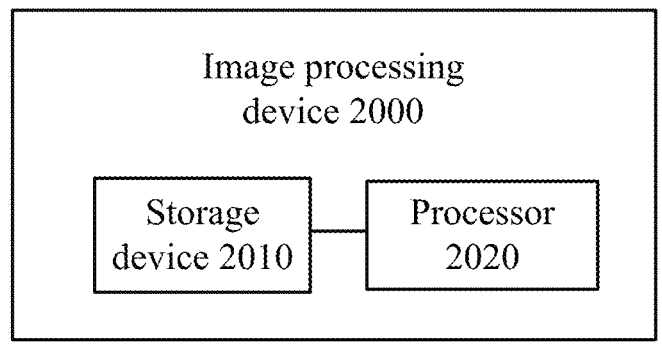
FIG. 10 is a schematic diagram of an image processing device, according to another example embodiment.

FIG. 10 is a schematic diagram of an image processing device of the receiver. As shown in FIG. 10, an image processing device 2000 may include at least one storage device 2010 configured to store computer-executable codes or instructions; and at least one processor 2020. The at least one processor 2020 may be configured independently or collectively to: access the at least one storage device 2010 to execute the computer-executable codes or instructions to implement method 300 and other various embodiments of the disclosed image processing methods. For simplicity, detailed descriptions of the execution are omitted.

The processor of the present disclosure may be any suitable processor. For example, the processor may include at least one of a central processing unit ("CPU"), a network processor ("NP"), or a combination of the CPU and NP. The processor may include a hardware chip. The hardware chip may include one or more of: an application-specific integrated circuit ("ASIC"), a programmable logic device ("PLD"), or a combination thereof. The PLD may be a complex programmable logic device ("CPLD"), a field-programmable gate array ("FPGA"), a generic array logic ("GAL"), or any combination thereof.

In some embodiments, the storage device may include a read-only storage device and/or a random-access storage device, and may provide codes, instructions, or data to the processor. A portion of the storage device may include a non-volatile random-access storage device. In some embodiments, the storage device may store information relating to device types.

Figure 11:
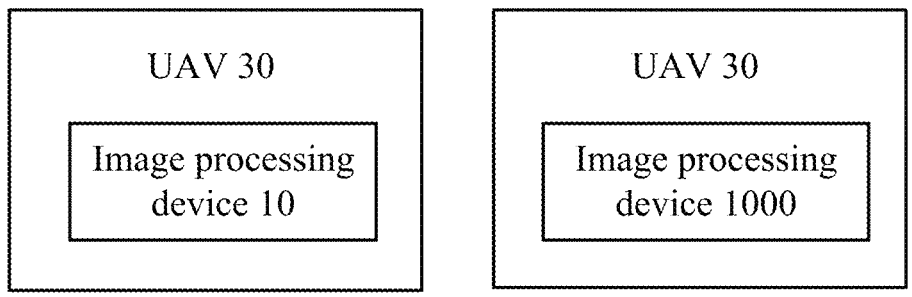
FIG. 11 is a schematic diagram of an unmanned aerial vehicle, according to an example embodiment.

FIG. 11 is a schematic diagram of a UAV. As shown in FIG. 11, a UAV 30 may include the image processing device 10 of FIG. 7, or the UAV 30 may include the image processing device 1000 of FIG. 9.

Figure 12:
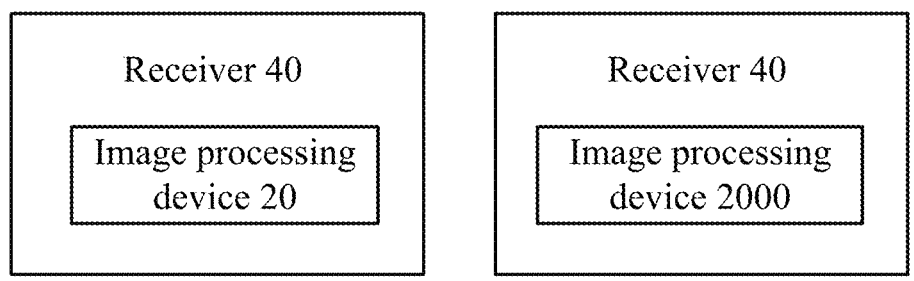
FIG. 12 is a schematic diagram of a receiver, according to an example embodiment.

FIG. 12 is a schematic diagram of a receiver. As shown in FIG. 12, a receiver 40 may include the image processing device 20 of FIG. 8 or the image processing device 2000 of FIG. 10.

A person having ordinary skill in the art can appreciate that various units or steps of the disclosed algorithms may be implemented using related electrical hardware, or a combination of electrical hardware and computer software that may control the electrical hardware. Whether the implementation of the functions is through hardware or software is to be determined based on specific application and design constraints. A person of ordinary skill in the art may use different methods to implement the functions for different applications. Such implementations do not fall outside of the scope of the present disclosure.

A person having ordinary skill in the art can appreciate that descriptions of the functions and operations of the system, device, and unit can refer to the descriptions of the disclosed methods.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using indirect coupling or communication between various interfaces, devices, or units. The indirect couplings or communication connections between interfaces, devices, or units may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated unit may be realized using hardware or a combination of hardware and software.

If the integrated units are realized as software functional units, the integrated units may be stored in a computer-readable storage medium. The software functional units may be storage in a non-transitory storage medium, including instructions or codes for causing a computing device (e.g., personal computer, server, or network device, etc.) or a processor to execute some or all of the steps of the disclosed methods. The storage medium may include any suitable medium that can store program codes or instructions, such as at least one of a U disk (e.g., flash memory disk), a mobile hard disk, a read-only memory ("ROM"), a random access memory ("RAM"), a magnetic disk, or an optical disc.

If the integrated units are realized as software functional units and sold or used as independent products, the integrated units may be stored in a computer-readable storage medium. Based on such understanding, the portion of the technical solution of the present disclosure that contributes to the current technology, or some or all of the disclosed technical solution may be implemented as a software product. The computer software product may be storage in a non-transitory storage medium, including instructions or codes for causing a computing device (e.g., personal computer, server, or network device, etc.) to execute some or all of the steps of the disclosed methods. The storage medium may include any suitable medium that can store program codes or instruction, such as at least one of a U disk (e.g., flash memory disk), a mobile hard disk, a read-only memory ("ROM"), a random access memory ("RAM"), a magnetic disk, or an optical disc.

The above descriptions only illustrate some embodiments of the present disclosure. The present disclosure is not limited the described embodiments. A person having ordinary skill in the art may conceive various equivalent modifications or replacements based on the disclosed technology. Such modification or improvement also fall within the scope of the present disclosure. A true scope and spirit of the present disclosure are indicated by the following claims.

What is claimed is:

1. An image processing method, comprising:
   obtaining a current image frame;
   determining a variable feedback time interval, including:
      determining a speed of change of attitude of a transmitter; and
      adjusting the variable feedback time interval based on the speed of change of the attitude;
   transmitting the variable feedback time interval to a receiver;
   in response to feedback information, determining a reference image frame for coding the current image frame based on the feedback information, the feedback information being transmitted by the receiver based on the variable feedback time interval, and the feedback information being configured to indicate a transmission status of an image frame transmitted by a transmitter to the receiver prior to the feedback information;
   coding the current image frame based on an inter-frame coding and the reference image frame to generate coded data; and
   transmitting the coded data to the receiver.

2. The method of claim 1, wherein determining the reference image frame for coding the current image frame based on the feedback information comprises:
   determining one or more correctly transmitted image frames based on the feedback information; and
   determining the reference image frame based on the one or more correctly transmitted image frames.

3. The method of claim 2, further comprising:
   storing at least a portion of the one or more correctly transmitted image frames to a reference image frame managing array,
   wherein determining the reference image frame based on the one or more correctly transmitted image frames comprises:
      determining the reference image frame based on one or more image frames stored in the reference image frame managing array.

4. The method of claim 1, further comprising:
   based on a determination that the feedback information is not received, determining a predetermine number of image frames transmitted prior to the current image frame as the reference image frame.

5. The method of claim 1, wherein the feedback information comprises at least one of indicator information that indicates whether a last image frame transmitted prior to the feedback information has been correctly transmitted, a frame number of an image frame that has been correctly transmitted, or a frame number of a last image frame that has been correctly transmitted prior to the feedback information.

6. The method of claim 1, wherein determining the variable feedback time interval comprises:
   determining the variable feedback time interval based on at least one of a load status of a feedback channel, a demand on a timeliness of error recovery by an application scene at the transmitter, or a transmission error rate in a predetermined time period.

7. The method of claim 1, wherein transmitting the coded data to the receiver comprises:
packaging the coded data to generate a data packet, the data packet comprising at least one of a serial number or a check value; and
transmitting the data packet to the receiver.

8. The method of claim 1, wherein the transmitter is included in an unmanned aerial vehicle.

9. An unmanned aerial vehicle, comprising:
a storage device configured to store computer-executable instructions; and
at least one processor configured to access the storage device and to execute the computer-executable instructions to perform a method comprising:
obtaining a current image frame;
determining a variable feedback time interval, including:
determining a speed of change of attitude of a transmitter; and
adjusting the variable feedback time interval based on the speed of change of the attitude;
transmitting the variable feedback time interval to a receiver;
in response to feedback information, determining a reference image frame for coding the current image frame based on the feedback information, the feedback information being transmitted by the receiver based on the variable feedback time interval, and the feedback information being configured to indicate a transmission status of an image frame transmitted by a transmitter to the receiver prior to the feedback information;
coding the current image frame based on an inter-frame coding and the reference image frame to generate coded data; and
transmitting the coded data to the receiver.

10. The unmanned aerial vehicle of claim 9, wherein the at least one processor is further configured to:
determine one or more correctly transmitted image frames based on the feedback information; and
determine the reference image frame based on the one or more correctly transmitted image frames.

11. The unmanned aerial vehicle of claim 10, wherein the at least one processor is further configured to:
store at least a portion of the one or more correctly transmitted image frames to a reference image frame managing array, and
determine the reference image frame based on one or more image frames stored in the reference image frame managing array.

12. The unmanned aerial vehicle of claim 9, wherein the at least one processor is further configured to:
based on a determination that the feedback information is not received, determine a predetermine number of image frames transmitted prior to the current image frame as the reference image frame.

13. The unmanned aerial vehicle of claim 9, wherein the feedback information comprises at least one of indicator information that indicates whether a last image frame transmitted prior to the feedback information has been correctly transmitted, a frame number of an image frame that has been correctly transmitted, or a frame number of a last image frame that has been correctly transmitted prior to the feedback information.

14. The unmanned aerial vehicle of claim 9, wherein the at least one processor is further configured to:
determine the variable feedback time interval based on at least one of a load status of a feedback channel, a demand on a timeliness of error recovery by an application scene at the transmitter, or a transmission error rate in a predetermined time period.

15. The unmanned aerial vehicle of claim 9, wherein the at least one processor is further configured to:
package the coded data to generate a data packet, the data packet comprising at least one of a serial number or a check value; and
transmit the data packet to the receiver.

16. The unmanned aerial vehicle of claim 9, wherein the transmitter is included in the unmanned aerial vehicle.

* * * * *